US008670881B2

(12) United States Patent
DeJonge (10) Patent No.: US 8,670,881 B2
(45) Date of Patent: *Mar. 11, 2014

(54) FLIGHT MANAGEMENT SYSTEM FOR GENERATING VARIABLE THRUST CUTBACK DURING AIRCRAFT DEPARTURE

(75) Inventor: Michael K. DeJonge, Caledonia, MI (US)

(73) Assignee: General Electric Company, Schenectady, NY (US)

( * ) Notice: Subject to any disclaimer, the term of this patent is extended or adjusted under 35 U.S.C. 154(b) by 1445 days.

This patent is subject to a terminal disclaimer.

(21) Appl. No.: 11/954,056

(22) Filed: Dec. 11, 2007

(65) Prior Publication Data

US 2009/0132106 A1 May 21, 2009

Related U.S. Application Data

(60) Provisional application No. 60/894,803, filed on Mar. 14, 2007.

(51) Int. Cl.
*B64C 19/00* (2006.01)

(52) U.S. Cl.
USPC ........ 701/15; 701/3; 701/5; 701/14; 244/1 N; 340/971

(58) Field of Classification Search
USPC ............. 701/3–5, 7–10, 14–16, 18, 120–122, 701/207, 208; 244/1 N, 188, 195; 73/178 T; 340/959, 964, 971
See application file for complete search history.

(56) References Cited

U.S. PATENT DOCUMENTS

| 3,455,160 | A | 7/1969 | Sleight |
| 4,019,702 | A * | 4/1977 | Annin ........................... 244/182 |
| 5,121,325 | A | 6/1992 | DeJonge |
| 5,299,765 | A | 4/1994 | Blechen |
| 5,752,216 | A | 5/1998 | Carlson et al. |
| 6,198,991 | B1 | 3/2001 | Yamakawa et al. |

(Continued)

FOREIGN PATENT DOCUMENTS

JP            09254897         9/1997

OTHER PUBLICATIONS

International Search Report and Written Opinion published on Sep. 9, 2009 in International Patent Application No. PCT/US08/56170.

(Continued)

*Primary Examiner* — Khoi Tran
*Assistant Examiner* — Spencer Patton
(74) *Attorney, Agent, or Firm* — General Electric Company; William Scott Andes; Matthew P. Hayden (57) ABSTRACT

A flight management system is provided for generating a variable thrust cutback during aircraft departure. The flight management system includes memory storing a sound exposure level limit for a navigation flight and storing expected sound exposure levels for an aircraft, and one or more inputs for receiving sensed aircraft variables including altitude and airspeed. The system also includes a processor for processing the sensed altitude and airspeed and stored sound exposure levels. The processor further computes an engine thrust value that complies with the sound exposure level limit based on the altitude, airspeed and the sound exposure levels for controlling aircraft throttle during departure.

10 Claims, 6 Drawing Sheets

(56) References Cited

U.S. PATENT DOCUMENTS

| | | | |
|---|---|---|---|
| 6,880,784 B1 * | 4/2005 | Wilkinson et al. | 244/76 R |
| 7,383,104 B2 * | 6/2008 | Ishii et al. | 701/3 |
| 2005/0098681 A1 * | 5/2005 | Berson et al. | 244/1 N |
| 2008/0114503 A1 | 5/2008 | Burnside | |
| 2008/0228413 A1 * | 9/2008 | Pilon | 702/56 |
| 2008/0312781 A1 | 12/2008 | Nikolic et al. | |
| 2009/0132107 A1 | 5/2009 | DeJonge | |

OTHER PUBLICATIONS

International Search Report and Written Opinion published on Sep. 9, 2009 in International Patent Application No. PCT/US08/56174.
Office Action mailed Mar. 17, 2011 in U.S. Appl. No. 11/954,086.
Japanese Office Action mailed Oct. 23, 2012 for Japanese Application No. 2009-553698.
Japanese Office Action mailed Oct. 23, 2012 for Japanese Application No. 2009-553700.

* cited by examiner

| SOUND EXPOSURE LEVEL (SEL) IN dB THRUST-RELATED ENGINE-POWER PARAMETER @ AIRSPEED = 160 KNOTS | | | | |
|---|---|---|---|---|
| MINIMUM DISTANCE, METERS | 3000 (lbf) | 4000 (lbf) | 7000 (lbf) | 9000 (lbf) |
| 80 | 96.5 | 100.1 | 108.3 | 114.3 |
| 100 | 95.0 | 98.7 | 106.9 | 112.5 |
| 125 | 93.6 | 97.3 | 105.5 | 111.1 |
| 160 | 92.0 | 95.7 | 104.0 | 109.6 |
| 200 | 90.6 | 94.3 | 102.6 | 108.2 |
| 250 | 89.1 | 92.7 | 101.1 | 106.7 |
| 315 | 87.5 | 91.1 | 99.5 | 105.2 |
| 400 | 85.9 | 89.5 | 97.9 | 103.6 |
| 500 | 84.2 | 87.8 | 96.3 | 102.0 |
| 630 | 82.5 | 86.1 | 94.6 | 100.2 |
| 800 | 80.5 | 84.2 | 92.7 | 98.4 |
| 1000 | 78.6 | 82.4 | 91.0 | 96.6 |
| 1250 | 76.5 | 80.3 | 89.0 | 94.7 |
| 1600 | | 77.9 | 86.7 | 92.4 |
| 2000 | | 75.3 | 84.5 | 90.1 |
| 2500 | | | 81.9 | 87.5 |
| 3150 | | | 79.0 | 84.6 |
| 4000 | | | 75.9 | 81.5 |
| 5000 | | | | 78.6 |
| 6300 | | | | 75.6 |
| 8000 | | | | |

FIG. 7

FLIGHT MANAGEMENT SYSTEM FOR GENERATING VARIABLE THRUST CUTBACK DURING AIRCRAFT DEPARTURE

CROSS-REFERENCE TO RELATED APPLICATION

This application claims priority to provisional application Ser. No. 60/894,803, entitled "Flight Management System and Method of Generating Variable Thrust Cutback During Aircraft Departure", filed Mar. 14, 2007.

BACKGROUND OF THE INVENTION

Technology described herein generally relates to aircraft flight management and, more particularly, relates to a system for computing aircraft engine throttle cutback during aircraft departure.

Aircraft are commonly equipped with a flight management system for managing aircraft flight control, generating flight profile data, and providing navigational information such as flight paths designated by waypoints that are represented by navigational location coordinates. Additionally, flight management control systems are also configurable to provide aircraft engine throttle settings for manual or automatic control of the engine thrust. During aircraft takeoff, a flight management system may determine engine thrust requirements to sufficiently elevate the plane on lift off from the runway such that the aircraft sufficiently climbs at a pitch rate, typically according to a programmed schedule or requirements set forth by the air traffic control.

Aircraft are typically equipped with jet engines capable of generating high levels of sound. Given the location of airports in close proximity to residential areas, the sound exposure levels (SEL) experienced within a nearby community due to aircraft departure have become an increasing issue which has lead to the implementation of noise abatement procedures to reduce the community noise during aircraft departures. More recently, the National Business Aircraft Association (NBAA) has attempted to establish a national standard for flight operations for noise abatement procedures. These procedures generally require that the aircraft, upon lift off from a runway during departure, climb at a maximum practical pitch rate to an altitude of one thousand feet above the runway airfield with flaps in a takeoff setting. Upon reaching the one thousand feet above field level, the procedures generally recommend that the aircraft accelerate to the final segment speed and retract the flaps. The procedures also recommend that the aircraft reduce the engine thrust to a quiet climb setting while maintaining a one thousand feet per minute climb rate and an airspeed not to exceed a defined speed until reaching an altitude of three thousand feet above field level. Above the three thousand feet level, the aircraft would resume the normal climb schedule with gradual application of climb power. Of course, the aircraft control would be subject to aircraft control requirements, and other airspeed limitations. Given differences with aircraft type and takeoff conditions, the aircraft pilot would have latitude to determine whether takeoff thrust should be reduced prior to, during, or after flap retraction.

The prior proposed noise abatement procedures typically employ fixed altitudes for thrust cutback and restoration, which typically results in aircrafts having different weights and different operating temperatures to be above different ground positions at the specified altitudes. For example, a heavy aircraft on a hot day will climb at a lesser pitch as compared to a lighter aircraft on a cold day. To ensure adequate noise reduction throughout the departure procedure, the thrust cutback and restoration altitudes are generally specified to be conservative, which results in a waste of fuel. It is generally recognized that a more efficient climb profile requires climbing with maximum uplift so that the aircraft spends less time at a low altitude where the drag coefficient is typically higher.

Additionally, with the prior proposed noise abatement procedures, a specified one thousand feet per minute climb rate is intended to provide the most thrust reduction possible and yet maintain a safe level of performance. However, depending upon the aircraft, the noise reduction realized with the power setting to achieve a one thousand feet per minute climb rate may be less than needed for compliance with the community ground noise limit. The actual noise footprint on the ground typically is a function of engine thrust setting, aircraft speed, and aircraft altitude above the ground. If engine thrust is reduced only enough to meet the required sound exposure level under current flight conditions, then a higher climb rate might be possible resulting in less time at lower altitude, and thus reducing drag and improving fuel economy.

Accordingly, it is therefore desirable to provide for an aircraft departure procedure that provides adequate noise reduction during the aircraft departure within the community noise standards, while enhancing fuel economy. It is further desirable to provide for a flight management system and method that efficiently manages the departure of an aircraft while providing optimal engine thrust cutback to efficiently achieve community noise abatement.

BRIEF DESCRIPTION OF THE INVENTION

In one aspect of the invention, a flight management system is provided for generating a variable thrust cutback during aircraft departure. The flight management system includes memory storing a sound exposure level limit for a navigation flight and storing expected sound exposure levels for an aircraft, and one or more inputs for receiving sensed aircraft variables including altitude and airspeed. The system also includes a processor for processing the sensed altitude and airspeed and stored sound exposure levels. The processor further computes an engine thrust value that complies with the sound exposure level limit based on the altitude, airspeed and the sound exposure levels for controlling aircraft throttle during departure.

BRIEF DESCRIPTION OF THE DRAWINGS

The accompanying drawings illustrate several embodiments of the technology described herein, wherein.

DETAILED DESCRIPTION OF PREFERRED EMBODIMENT

Figure 1:
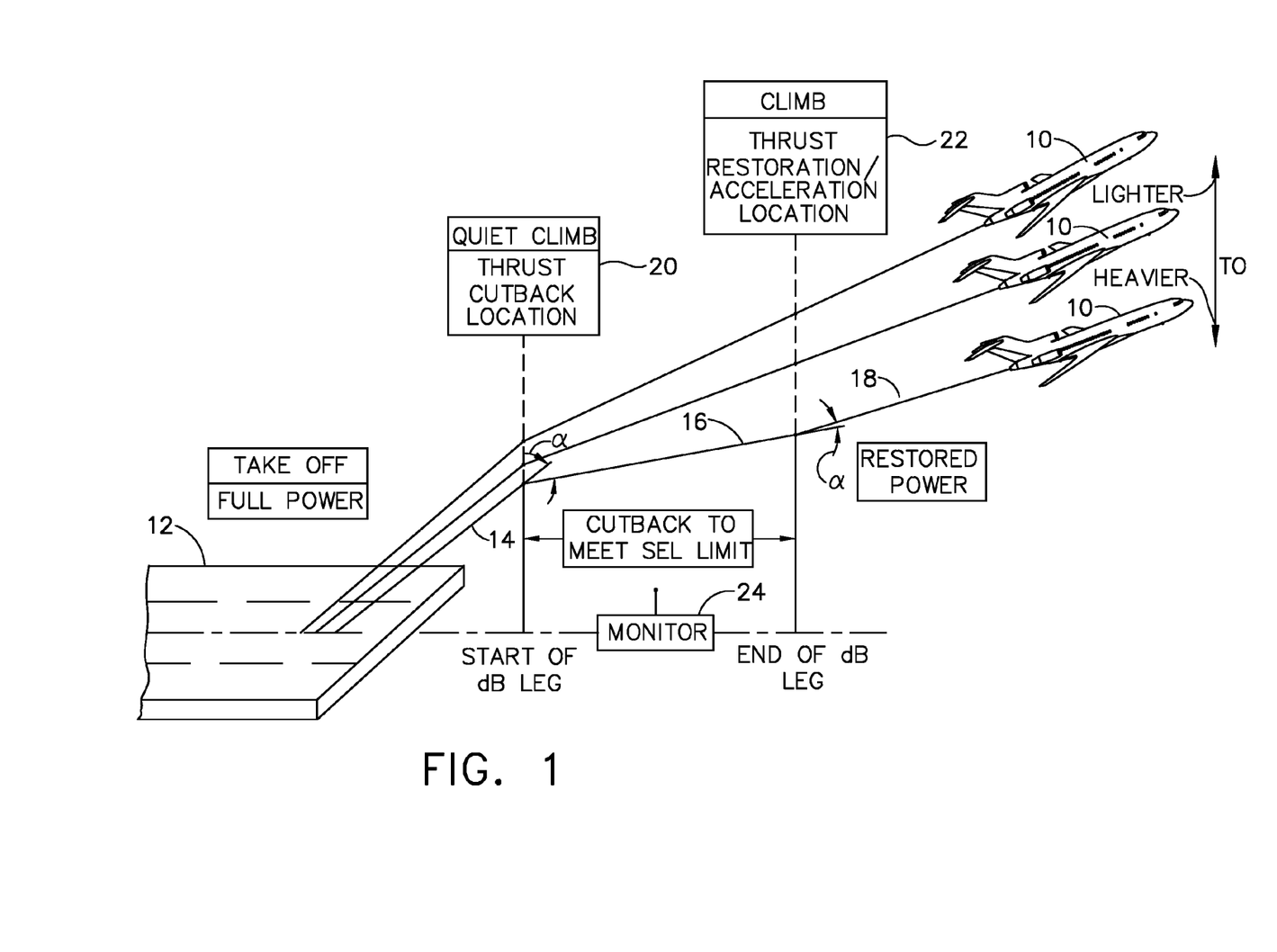
FIG. 1 is an elevational view of aircraft departing an airport runway employing a thrust cutback climb profile, according to one embodiment of the present invention.

Referring to FIG. 1, the departure of aircraft 10 from an airport runway 12 are generally illustrated according to an aircraft climb profile realized pursuant to a variable engine thrust reduction to achieve community noise reduction at an enhanced efficiency, according to the present invention. The aircraft 10 may include jet propelled and propeller driven aircraft, as are commonly employed throughout the aircraft industry. In the example shown, three aircraft 10 of different weights follow different departure paths due to variances in the aircraft such as the weight differences.

During takeoff or departure from an airport runway 12, an aircraft 10 accelerates, typically at full power, with aircraft flaps set in the takeoff position such that the aircraft lifts off from the runway at an initial climb rate (pitch rate) on path 14 and climb angle α. The aircraft climb rate may vary depending upon size and weight of the aircraft, engine thrust, and atmospheric conditions such as temperature, wind, and other variables. Upon the aircraft 10 reaching a quiet climb location or waypoint 20, a dB leg in a navigation database begins and a thrust compute routine starts so that the thrust of the aircraft engine is cutback to meet required maximum allowable sound exposure levels (SEL). The engine thrust cutback may be variable and is based on a continuously computed value. Beginning at waypoint 20 in the quiet climb region, the aircraft 10 continues on path 16 until the thrust restoration/acceleration location or waypoint 22 is reached. Beyond location 22, the dB leg ends and the thrust compute routine ends and full power may be restored to the aircraft 10 as it continues to climb on path 18 and climb angle α.

Sound monitor 24 is also shown located on the ground generally between the thrust cutback location 20 and thrust restoration/acceleration location 22 for monitoring sound experienced on the ground due to aircraft flying overhead. The sound monitor 24 is typically located near the airport and may be monitored by a governmental authority, such as air traffic control, to insure that aircraft departing from the runway 12 are in compliance with community noise standards. The aircraft departure procedure provided by the present invention advantageously insures that the aircraft comply with the community noise standard in an efficient manner during departure.

Figure 2:
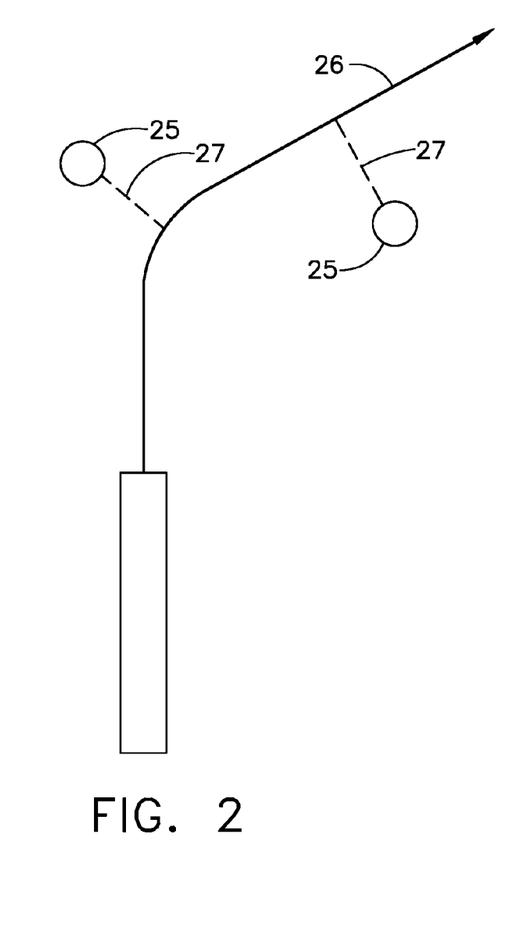
FIG. 2 is a plan view of the flight path of an aircraft departing an airport runway employing a thrust cutback climb profile, according to one embodiment of the present invention.
Figure 3:
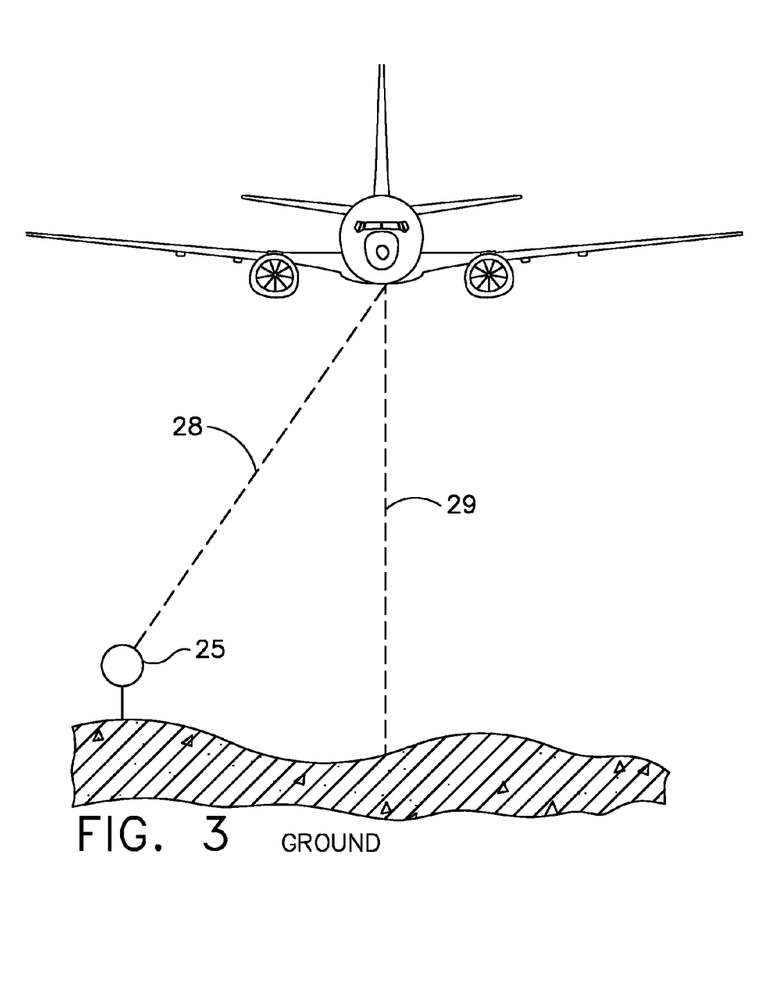
FIG. 3 is an elevational view of the flight path of an aircraft departing an airport runway employing a thrust cutback climb profile, according to one embodiment of the present invention.

Referring to FIGS. 2 and 3, a dB leg can be computed based upon a number of sound monitor points 25 that are along the path of flight 26 as an alternative to storing a fixed maximum SEL level associated with a flight leg. In this embodiment, the SEL level associated with the intended flight path is determined as a variable along the flight path by interpolating between points that are abeam to each sound monitor point 27. The maximum SEL at each abeam point on the path is based on the distance from the aircraft to sound monitoring point 28 at the abeam point as compared to the distance from the aircraft above the flight path 29.

Figure 4:
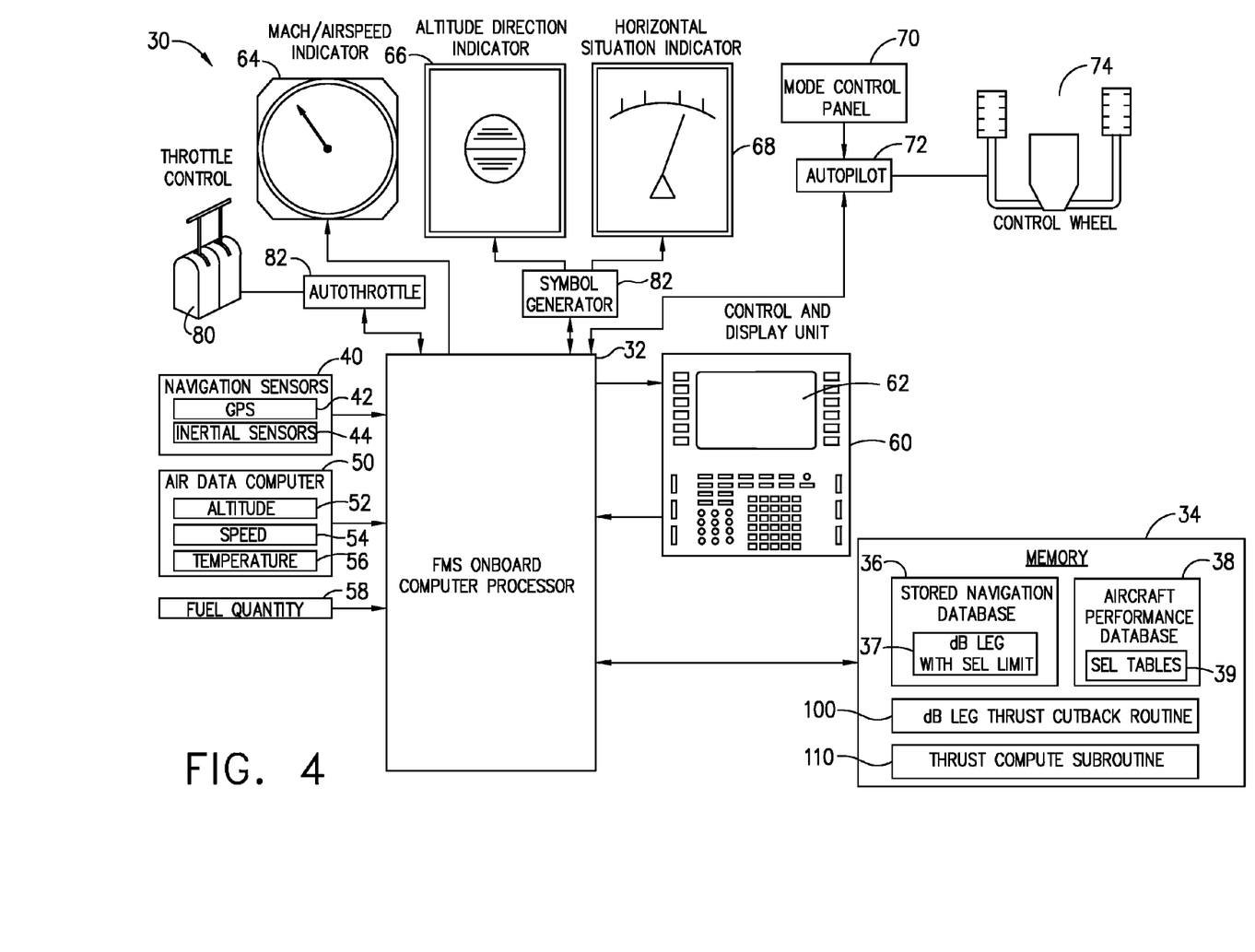
FIG. 4 is a block diagram illustrating a flight management system employed onboard an aircraft and configured to provide the thrust cutback flight control, according to one embodiment of the present invention.

Referring to FIG. 4, one embodiment of a flight management system 30 is generally illustrated configured with the aircraft departure procedure of the present invention so as to efficiently provide engine thrust cutback to achieve community noise reduction. In the embodiment shown, the flight management system 30 includes an FMS onboard computer processor 32 and memory 34. Memory 34 includes a stored navigation database 36 which stores aircraft navigation information including dB leg 37 information. The dB leg 37 includes navigational waypoints and one or more sound exposure level limits for that leg. Memory 34 also includes an aircraft performance database 38 which includes aircraft specific information including expected sound exposure levels in SEL tables 39. A dB leg thrust cutback routine 100 and a thrust compute routine 110 are also stored in memory 34. The onboard computer processor 32 receives various inputs including sensed aircraft altitude 52, sensed aircraft speed 54, and sensed air temperature 56 from air data computer 50. Additionally, the processor 32 receives inputs from navigation sensors 40, such as location coordinates from a global positioning system (GPS) 42 and inertial data from inertial sensors 44. Further, processor 32 receives other inputs from other sensors such as fuel quantity 58, and other sensed variables as should be evident to those skilled in the art.

The onboard computer processor 32 is further shown in communication with a control and display unit (CDU) 60 having a display 62. It should be appreciated that the control and display unit 60 is a human machine interface that allows pilots to input data and to receive output data. For example, output data indicating the computed engine thrust or thrust cutback may be provided in display pages presented on display 62 to allow a pilot of the aircraft to operate the aircraft pursuant to the output data provided by the flight management system 30.

The flight management system 30 is further shown having a mach/airspeed indicator 64, an altitude direction indicator 66, and a horizontal situation indicator 68. A symbol generator 78 is coupled between processor 32 and each of indicators 66 and 68. The flight management system 30 also includes a mode control panel 70 providing an output to an autopilot 72, which is also in communication with processor 32. The autopilot 72 may be part of a flight control system and may operate control wheel 74 in an automatic piloting mode.

The flight management system 30 is further shown including a throttle control 80 for controlling the engine throttle, as should be evident to those skilled in the art. The throttle control 80 may be manually actuated by a pilot of the aircraft in a manual mode. In an automatic flight control mode, the throttle control 80 may be automatically controlled by an auto throttle signal 82 provided by processor 32. It should be appreciated that the processor 32 may output command signals for controlling the aircraft with the computed throttle or throttle cutback value according to the present invention by providing output commands via display 62 or by automatically controlling the throttle 80 via auto throttle signal 82.

The flight management system 30 shown and described herein is one embodiment of a flight management system that may be configured to perform thrust cutback of an aircraft during the aircraft departure procedure. In this embodiment, the thrust cutback routine 100, its associated thrust compute subroutine 110, the dB leg with SEL limit(s), and the sound exposure level (SEL) tables 36 are stored in memory 34. It should be appreciated that the memory 34 and its stored navigation database 36 may include an existing navigation database in an existing flight management system that is upgraded to perform the thrust cutback departure procedure. One example of an existing flight management system is disclosed in U.S. Pat. No. 5,121,325. The aircraft performance database 38 may also be added to an existing FMS as an upgrade. It should be appreciated that other flight management systems may be configured to perform the thrust cutback, according to the teachings of the present invention.

The dB leg thrust cutback routine 100 continuously generates a variable thrust value in compliance with the SEL limits which is a specified maximum not-to-exceed noise level or levels requirement. The dB leg is specified by a waypoint location and a specified not-to-exceed sound exposure level is assigned to the dB leg for the entire leg until the next waypoint. When the aircraft position is determined to have passed the navigation waypoint 20 starting the dB leg, thrust cutback routine 100 computes the noise-limited thrust that can be applied to maintain the aircraft within the maximum sound exposure level for that navigation leg. The noise-limited thrust is applied if the value falls between the applicable flight-phase thrust limit during takeoff and the minimum allowable thrust, which is usually specified as a minimum percent reduction of full rated thrust. Additionally, the aircraft altitude, while on the dB leg, must be above a preset level that, according to one example, is typically about eight hundred feet above the departure airport reference altitude before any reduction is applied.

Figure 5:
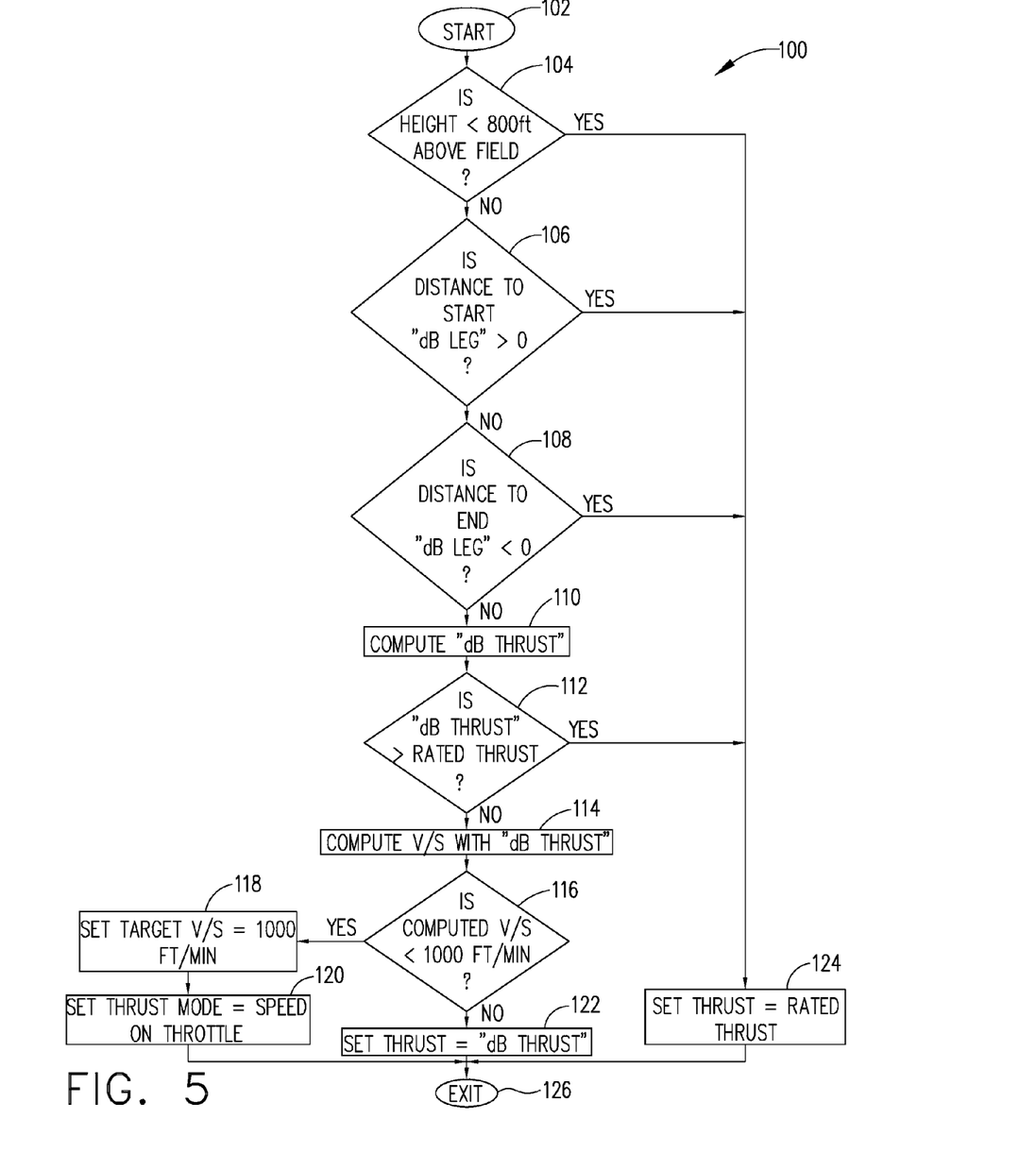
FIG. 5 is a flow diagram illustrating a dB leg thrust cutback routine for determining engine thrust during the aircraft departure procedure.

The dB leg thrust cutback routine 100 stored in memory 34 and executed by processor 32 is illustrated in FIG. 5, according to one embodiment. Routine 100 begins with step 102 and proceeds to determine if the height of the aircraft is less than eight hundred feet above the field in step 104. If the aircraft has not obtained a height or altitude of at least eight hundred feet, routine 100 will set the engine thrust to the rated thrust in step 124 and then exit at step 126. For safety purposes, the thrust reduction is not performed until the aircraft is at a predetermined height, such as the eight hundred feet above ground level. Once the aircraft has obtained an altitude of at least eight hundred feet, routine 100 determines if the distance to the starting location of the dB leg is less than zero in step 106 and, if not, proceeds to step 108 to determine if the distance to the end of dB leg is greater than zero. Step 106 determines if the starting point of the dB leg has not been reached and step 108 determines if the end point of the dB leg has been reached. If the location of the aircraft is outside of the dB leg, no thrust reduction is applied and thrust is set to the rated thrust in step 124 and is used for aircraft climb. In this phase of flight, speed is typically controlled by the aircraft flap setting specified in the departure procedure by pitch control. This is commonly referred to as the speed on elevator mode since the aircraft elevators are used to control pitch.

Once the aircraft is determined to be flying based on the dB leg, routine 100 proceeds to step 110 to compute the dB thrust which is the thrust value that results in efficient achievement of the sound exposure level limit specified by the thrust cutback procedure. The computation of the dB thrust is achieved by processing a set of SEL tables 39 stored in the aircraft performance database 38, according to one embodiment. One example of such an SEL table 39 is illustrated in FIG. 7. The SEL table set that is applicable to a specific aircraft and engine type is selected from the aircraft/engine performance database 38. Inputs to the table include thrust, height above ground, and true air speed (TAS), which in combination result in generated sound exposure levels (SEL) as specified. In this application, the thrust cutback routine 100 determines the thrust required for a specified SEL level, such that an incremental change in thrust, referred to as the delta (Δ) thrust value, is applied until the computed SEL is equal to the SEL limit, as shown and described below in the subroutine 110 shown in FIG. 6.

Figure 6:
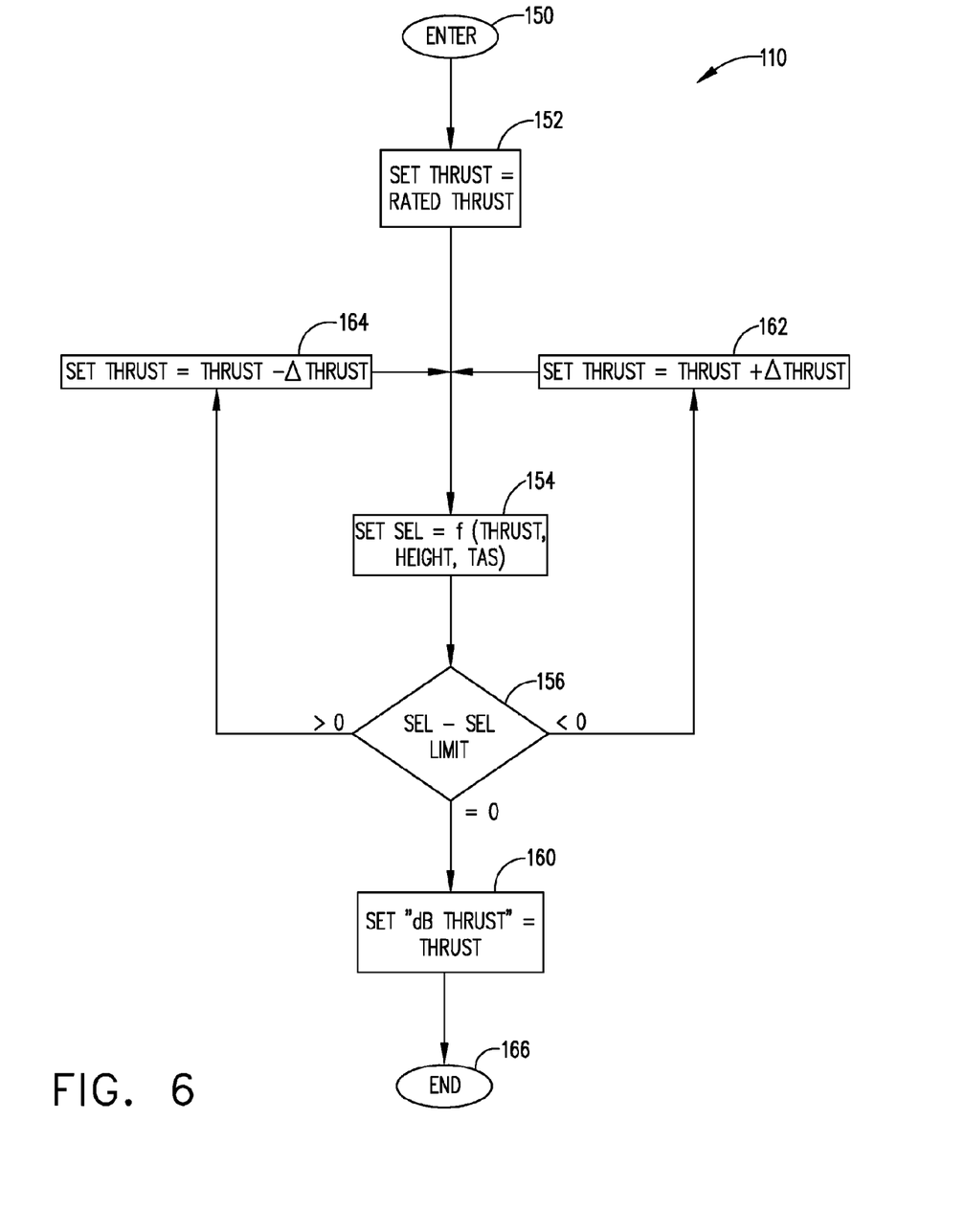
FIG. 6 is a flow diagram illustrating the compute thrust routine employed in the routine of FIG. 5.
Figure 7:
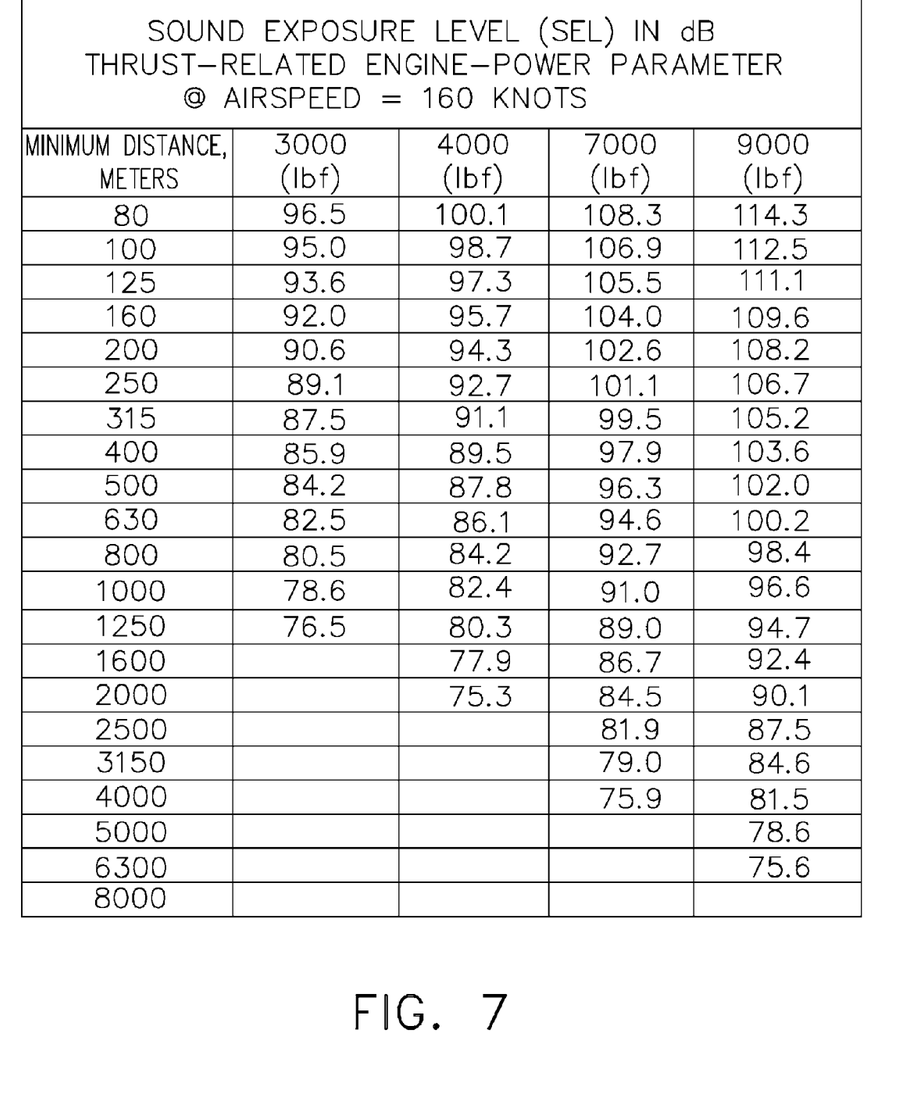
FIG. 7 is a table containing exemplary aircraft performance data including sound exposure levels, engine thrust, and altitude stored in memory for use in computing the thrust cutback.

Referring to FIG. 6, the dB thrust subroutine begins at step 150 and proceeds to set the thrust equal to the rated thrust in step 152. Next, in step 154, thrust compute subroutine 110 sets the SEL equal to a function based on thrust, height, and true aircraft speed (TAS). Given that the SEL, height, and TAS are known, routine 110 can solve for the thrust. Next, routine 110 compares the SEL to the SEL limit and if equal, proceeds to step 160 to set the dB thrust equal to the thrust before ending at step 166. If the difference between the SEL and SEL limit is less than zero, routine 110 proceeds to step 162 to set the thrust equal to a positive delta (+Δ) thrust and then returns to step 154. If the difference in SEL minus SEL limit is greater than zero, then routine 110 proceeds to step 164 to set the thrust equal to a negative delta (−Δ) thrust and then returns to step 154.

Following computation of the dB thrust value in subroutine 110, routine 100 proceeds to decision step 112 to determine if the computed dB thrust value is greater than a rated thrust and, if so, proceeds to set the thrust equal to the rated thrust in step 124, prior to exiting at step 126. Thus, if the computed dB thrust is greater than the rated thrust, the rated thrust is used, since the SEL will be below the SEL limit. If the computed dB thrust is less than the rated thrust, routine 100 proceeds to step 114 to compute the aircraft vertical speed (v/s) with the computed dB thrust. Next, routine 100 determines if the computed vertical speed is less than one thousand feet per minute in decision step 116. If the computed aircraft vertical speed is equal to or greater to one thousand feet per minute, routine 100 proceeds to set the thrust equal to the computed dB thrust in step 122 before existing at step 126. If the computed aircraft vertical speed is less than one thousand feet per minute, routine 100 sets a target vertical speed equal to one thousand feet per minute in step 118, and then sets the thrust mode equal to the speed on throttle in step 120. In this situation, the computed dB thrust is ignored and the throttle is controlled so as to maintain the minimum specified aircraft vertical velocity, which in this embodiment is one thousand feet per minute. Alternately a minimum climb gradient (typically 1.2 percent) may be used to compute the lower limit for aircraft thrust in place of a minimum aircraft vertical velocity. As such, the noise abatement limit may be ignored when the aircraft fails to maintain a minimum climb performance.

Accordingly, when the computed dB thrust is greater than the rated thrust, the rated thrust is used since the SEL will be below the SEL limit. If the computed dB thrust is less than the rated thrust, the dB thrust is applied as long as the resulting climb gradient is above a specified limit, such as one thousand feet per minute. In either of these cases, the aircraft speed is controlled by the speed on elevator mode. If the dB thrust results in a climb gradient less than one thousand feet per minute, the pitch mode is changed to control the vertical speed and the airspeed controlled by the resulting thrust will cause the SEL to be above the SEL limit. If should be appreciated that the specified climb gradient of one thousand feet per minute may be changed, depending upon the aircraft and conditions.

Referring to FIG. 7, one example of the expected sound exposure levels (SEL) in decibels (dB) for a specific aircraft engine at a specified true airspeed of 160 knots is illustrated. The SEL values are a function of the true air speed, the minimum distance (height), and the thrust. Examples of select minimum distances at engine thrust values at the 3000, 4000, 7000 and 9000 pounds-force (lbf) are illustrated in the exemplary table. For a given engine, the thrust of 9000 lbf may represent a full power engine thrust at the initial aircraft takeoff, where a 7000 lbf thrust may represent an intermediate thrust cutback level. It should be appreciated that the values of expected SEL found in the table may be determined based on measurements made in the field for a specific aircraft engine. It should also be appreciated that the values obtained in the table may be obtained from modeling an aircraft and estimating the SEL values. Other tables may be generated for different aircraft speeds, and each of the tables may be stored in the stored navigation database and used to compute the thrust cutback during aircraft departure.

Techniques are known for calculating sound exposure levels at ground locations as a result of operations of jet and propeller driven airplanes in the vicinity of an airport. One example of a procedure for calculating airport noise in a vicinity of an airport is disclosed in SAE Aerospace Information Report SAE AIR 1845, issued March 1986, entitled "Procedure for the Calculation for Airport Noise in the Vicinity of Airports." Another document that discloses procedures for calculating airport noise is the U.S. Department of Transportation Report entitled "Integrated Noise Model (INM) Version 6.0 Technical Manual," reported on January 2002. It should be appreciated that these and other procedures are known and available for calculating airport noise in the vicinity of the airport during aircraft departure, which may be employed to generate the sound exposure levels stored in the navigation database.

It should be appreciated that the thrust cutback method and flight management system described herein advantageously provide for efficient departure of an aircraft, while providing compliance with community noise requirements. It should be appreciated that in a case of lightweight aircraft, the aircraft may have a high enough altitude at the start of the dB leg that no thrust reduction may be required to be within the SEL limit. Thus, thrust is reduced only when necessary to meet the SEL limit resulting in more fuel efficient flight profiles.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An aircraft flight management system configured to generate variable thrust cutback during aircraft departure, said system comprising:
   memory storing a sound exposure level limit for a flight and storing expected sound exposure levels for an aircraft;
   one or more inputs configured to receive sensed aircraft variables comprising altitude, location relative to a monitoring station and airspeed; and
   a processor configured to process the sensed altitude, location relative to a monitoring station, airspeed and stored sound exposure levels, said processor further computing an engine thrust value that complies with the sound exposure level limit based on the altitude, location relative to a monitoring station, airspeed and the expected sound exposure levels; the engine thrust value being configured to control aircraft throttle during departure.

2. The system as defined in claim 1, further comprising an output configured to output the computed engine thrust value to a display.

3. The system as defined in claim 1, further comprising an output configured to output the computed engine thrust value to an engine throttle controller configured to control engine throttle.

4. The system as defined in claim 1, wherein the computed engine thrust is employed to control engine throttle when the aircraft reaches a navigation location.

5. The system as defined in claim 1, wherein the computed engine thrust is employed to control engine throttle when the aircraft is above a predefined altitude.

6. The system as defined in claim 1, wherein the memory comprises a stored navigation database storing the sound exposure level limit.

7. The system as defined in claim 1, wherein the computed engine thrust is maintained if vertical speed of the aircraft is above a predefined minimum vertical speed.

8. The system as defined in claim 1, wherein the computed engine thrust is determined by comparing the sensed aircraft variables to the expected sound exposure levels and computing a thrust value that corresponds to the sound exposure limit.

9. The system as defined in claim 1, further comprising a plurality of tables stored in memory that specify expected sound levels on the ground for an aircraft as a function of thrust, height, and aircraft speed.

10. An aircraft flight management system configured to generate variable thrust cutback during aircraft departure, said system comprising:
    memory storing a sound exposure level limit for a flight and storing expected sound exposure levels for an aircraft;
    one or more inputs configured to receive sensed aircraft variables comprising altitude and airspeed;
    a plurality of tables stored in memory that specify expected sound levels on the ground for an aircraft as a function of thrust, height, location relative to a monitoring station, and aircraft speed;
    a processor configured to process the sensed altitude, location relative to a monitoring station, airspeed and stored sound exposure levels, said processor further computing an engine thrust value that complies with the sound exposure level limit based on the altitude, location relative to a monitoring station, airspeed and the expected sound exposure levels; the engine thrust value being configured to control aircraft throttle during departure; and
    an output configured to output the computed engine thrust value;
    wherein the computed engine thrust is determined by comparing the sensed aircraft variables to the expected sound exposure levels and computing a thrust value that corresponds to the sound exposure limit, and
    wherein the computed engine thrust is employed to control engine throttle.

* * * * *